(12) United States Patent
Altmann

(10) Patent No.: US 6,384,328 B1
(45) Date of Patent: May 7, 2002

(54) MULTIPLE SWITCH

(75) Inventor: Markus Altmann, Moos-Bankholzen (DE)

(73) Assignee: TRW Automotive Safety Systems GmbH & Co. KG, Radolfzell (DE)

( * ) Notice: Subject to any disclaimer, the term of this patent is extended or adjusted under 35 U.S.C. 154(b) by 0 days.

(21) Appl. No.: 09/677,960

(22) Filed: Oct. 3, 2000

(30) Foreign Application Priority Data

Oct. 7, 1999 (DE) ..................... 299 17 684 U

(51) Int. Cl.⁷ .............................................. H02G 3/04
(52) U.S. Cl. ........................... 174/48; 174/60; 220/3.2
(58) Field of Search .............................. 174/48, 50, 58, 174/17 R, 60, 52.4; 220/3.2, 3.8, 3.3, 4.02, 3.6

(56) References Cited

U.S. PATENT DOCUMENTS

| | | | |
|---|---|---|---|
| 4,135,337 A | * | 1/1979 | Medlin ........................ 220/3.3 |
| 4,616,104 A | * | 10/1986 | Lindsey ........................ 174/48 |
| 4,873,600 A | * | 10/1989 | Vogele ...................... 174/50 X |
| 4,954,798 A | | 9/1990 | Kasahara et al. |
| 5,594,207 A | * | 1/1997 | Fabian et al. .................. 174/58 |
| 5,646,371 A | * | 7/1997 | Fabian ..................... 220/3.6 X |
| 6,147,304 A | * | 11/2000 | Doherty ........................ 174/48 |

FOREIGN PATENT DOCUMENTS

| | | |
|---|---|---|
| DE | 19510493 | 10/1995 |
| DE | 3828277 | 2/1996 |

* cited by examiner

Primary Examiner—Anthony Dinkins
Assistant Examiner—Dhiru R Patel
(74) Attorney, Agent, or Firm—Tarolli, Sundheim, Covell, Tummino & Szabo L.L.P.

(57) ABSTRACT

A multiple switch includes a pair of switch units arranged in a row and forming a common actuating surface. The switch units are provided with uniform module housings (12). The adjoining module housings (12) are mechanically rigidly coupled to each other by a connecting element (14).

10 Claims, 1 Drawing Sheet

MULTIPLE SWITCH

The present invention relates to an electrical multiple switch, comprising two or more switch units arranged in a row and defining a common actuating surface.

BACKGROUND OF THE INVENTION

Multiple switches are used in motor vehicles for the electrical control of various devices when related control functions are rendered visualized by packaged switch arrays in accordance with ergonomic and also design criteria, e.g. on the dashboard. By making use of discrete switch modules for inserting in suitable openings of a facial panel, optional arrays of switches can be combined; however, fitting and wiring the discrete switch modules is highly complicated. This is why such multiple switches are fabricated in uniform modules which ensure not only a perfect alignment of the switch units for a neat appearance but also rationally and functionally correct wiring of the discrete switch units.

The production of such multiple switches having housings made mostly of plastics necessitates complex, additional molds and production lines which due to the resulting extra expense involved bloat the production costs.

BRIEF SUMMARY OF THE INVENTION

The invention provides a multiple switch which, whilst having no disadvantages as regards its visualization and rationally and functionally correct wiring, is considerably more cost-effective in production.

In accordance with the invention the switch units are provided with uniform separate module housings, and two adjoining module housings are mechanically rigidly coupled to each other by a connecting element, thus enabling the module housings for optionally complex multiple switches to be produced with the same relatively simple mold. The connecting element is a component simple in shape whose production likewise involves little expense. The adjoining switch units may be configured in a uniform geometry and provided with symbols to distinguish them from each other.

It is particularly expedient to produce the module housings as well as the connecting element by injection molding from plastics.

The module housings of the multiple switch are coupled preferably both with an interlocking fit and by welding to the connecting element and thus also to each other. Perfect alignment of the module housings relative to the common switch facial panel is achievable by making use of a template and subsequent welding to make the final location.

The positive connection elements on the two terminal sides for mechanically coupling and prelocating the module housings having the necessary number of connecting parts are preferably polarized, i.e. differing by at least one property such as shape, size and arrangement so as to ensure an unmistakable orientation of the module housings within a switch array.

BRIEF DESCRIPTION OF THE DRAWINGS

Further features and advantages of the invention read from the following description of an advantageous embodiment and with reference to the attached drawings in which.

DETAILED DESCRIPTION OF THE INVENTION

Figure 1:
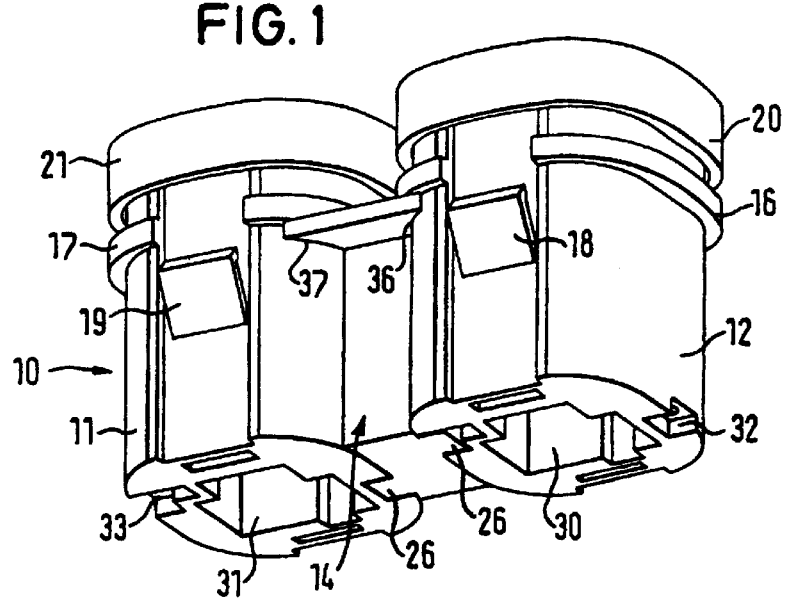
FIG. 1 is a view in perspective of a multiple switch including two switch units.
Figure 2:
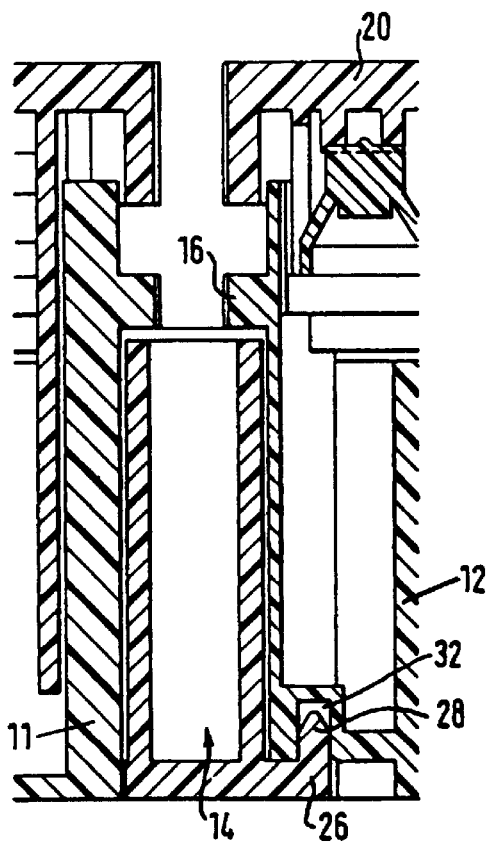
FIG. 2 is a detail section through the multiple switch.
Figure 3:
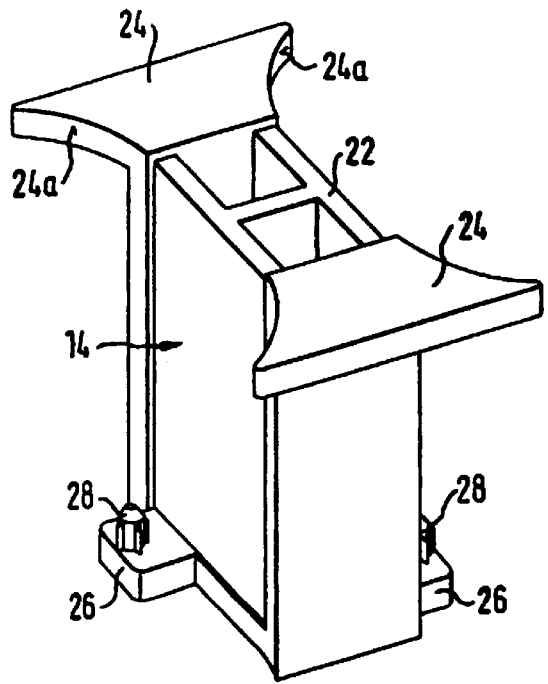
FIG. 3 is a view in perspective of a connecting element on a magnified scale.

Referring now to FIG. 1 there is illustrated the multiple switch identified in general by the reference numeral 10, it comprising two switch units each including a module housing 11, 12 and a connecting element 14 connecting the adjoining module housings. The uniform module housings 11, 12 are in general cylindrical, have a cross-sectional shape corresponding to the desired appearance and are designed for insertion in a common switch facial panel on a dashboard mount in the vehicle. They are produced by being injection molding from plastics using a uniform mold, the same as for the connecting element 14. For their alignment in a common switch facial panel the module housings 11, 12 have a peripheral support collar 16, 17 and are provided with latching elements 18, 19 which when inserted into an opening in the switch facial panel clasp the rim of this opening. Each switch unit is provided with a key 20, 21 slidingly guided in the corresponding module housing 11, 12, whereby the key may be provided with an illuminatable symbol.

The connecting element 14 consists of a generally cuboidal (generally parallelepipedal) base body 22 comprising two parallel main surface areas capable of being joined to the side surface areas of the module housing 11, 12, a base surface area, an upper side parallel to the base surface area and two narrow face surface areas. Molded to the narrow sides of these face surface areas remote from the base surface area is a vertically projecting flange 24. The flanges 24 comprise two connecting surface areas 24a capable of being brought in snug contact with the sidewalls of the module housing. Molded to the base surface area are two tabs 26 protruding beyond the main surface areas. The arrangement of the tabs 26 on both sides of the base body 22 is unsymmetrical. The tabs 26 each comprise at least one pin 28 projecting toward the upper side. The two centering pins 28 of each connecting element 14 differ in size and/or shape.

On each of the base surface areas lying opposite to the keys 20, 21, respectively, recesses 32, 33 are formed juxtaposed to centrally arranged shafts 30, 31, respectively, the recesses 32, 33 each corresponding in size, shape and arrangement to the tabs 26 with the centering pins 28.

In fitting the multiple switch 10 first the adjoining module housing 11, 12 is prelocated by inserting the tabs 26 with the centering pin 28 of a connecting element 14 into the corresponding recesses 32, 33 of the module housing 11, 12, the connecting surface areas 24a of the flanges 24 thereby engaging below the support collar 16, 17. The polarization afforded by the differing sizes of the centering pins 28 prevents the switch units from being oriented the wrong way round, i.e. turned through 180°, in the multiple switch 10. The module housings 11, 12 are then precisely aligned in a template. Subsequently a final location is achieved by welding, preferably ultrasonic welding, in the region of the connecting surface areas 24a, as indicated by the reference numeral 36, 37 in FIG. 1.

What is claimed is:

1. A multiple switch, comprising at least two switch units arranged in a row and each having an actuating surface located in a front surface common to both switch units, each of said switch units having an individual module housing, each of said module housings being of a uniform shape, each of said module housings being adjoined to each other and being mechanically rigidly coupled to each other by a connecting element, and said connecting element having at least two protuberances insertable in corresponding recesses of each of said module housings.

2. The multiple switch as set forth in claim 1, wherein said proturberances and recesses on one side of said module housing differ by at least one of the following properties from those of an opposite side: size, shape, arrangement.

3. The multiple switch as set forth in claim 1, wherein each of said module housings is coupled with said connecting element with an interlocking fit.

4. The multiple switch as set forth in claim 1, wherein each of said module housings and said connecting element are formed of plastics.

5. The multiple switch as set forth in claim 1, wherein each of said module housings is coupled with said connecting element both with an interlocking fit and by welding.

6. A multiple switch, comprising at least two switch units arranged in a row and each having an actuating surface located in a front surface common to both switch units, each of said switch units having an individual module housing, each of said module housings being of a uniform shape, said module housings being adjoined to each other and being mechanically rigidly coupled to each other by a connecting element, said connecting element having a generally parallelepipedal base body comprising two parallel main surface areas capable of being joined to respective side surface areas of each of said module housings, a base surface area, an upper side parallel to said base surface area, two narrow face surface areas, a perpendicularly projecting flange integrally moulded to each narrow face surface area on an end remote from said base surface area, said flange comprising two connecting surface areas capable of being brought in snug contact with said sidewalls of said module housing, said base surface area having two tabs protruding beyond said main surface areas, said tabs each comprising at least one pin projecting toward said upper side, and recesses formed on the base surface area of said module housings, said recesses corresponding to the tabs and pins.

7. The multiple switch as set forth in claim 6, wherein said pins are conical in shape.

8. The multiple switch as set forth in claim 7, wherein each of said connecting surface areas of said flanges engages below a surrounding support collar at the side surface area of a module housing.

9. The multiple switch as set forth in claim 6, wherein said flanges are connected to said side surface areas of said module housings by ultrasonic welding.

10. A multiple switch comprising:
   at least two switch units arranged in a row and each having an actuating surface, each of said switch units having an individual separately formed module housing, each of said module housings being adjoined to each other and being mechanically rigidly coupled to each other by a separately formed connecting element, each of said module housings being of a uniform shape and each of said actuating surfaces being slidable relative to each of said corresponding module housings.

* * * * *